(12) United States Patent
Hwang et al.

(10) Patent No.: US 11,741,725 B2
(45) Date of Patent: Aug. 29, 2023

(54) APPARATUS AND METHOD FOR RECOGNIZING DRIVING LANE BASED ON MULTIPLE SENSORS

(71) Applicants: HYUNDAI MOTOR COMPANY, Seoul (KR); KIA Corporation, Seoul (KR); KOREA NATIONAL UNIVERSITY OF TRANSPORTATION Industry-Academic Cooperation Foundation, Shungju-si (KR)

(72) Inventors: Dae-Sung Hwang, Hwaseong-si (KR); Jun-Ho Park, Gwangmyeong-si (KR); Jae-Kyu Suhr, Incheon (KR); Youn-Joo Lee, Chungju-si (KR); Ho-Gi Jung, Seoul (KR)

(73) Assignees: Hyundai Motor Company, Seoul (KR); Kia Corporation, Seoul (KR); Korea National University of Transportation Industry-Academic Cooperation Foundation, Chungcheongbuk-do (KR)

(*) Notice: Subject to any disclaimer, the term of this patent is extended or adjusted under 35 U.S.C. 154(b) by 301 days.

(21) Appl. No.: 17/344,287

(22) Filed: Jun. 10, 2021

(65) Prior Publication Data
US 2022/0147744 A1 May 12, 2022

(30) Foreign Application Priority Data
Nov. 12, 2020 (KR) .................. 10-2020-0150903

(51) Int. Cl.
*G06V 20/56* (2022.01)
*G01C 21/00* (2006.01)
(Continued)

(52) U.S. Cl.
CPC ....... *G06V 20/588* (2022.01); *G01C 21/3658* (2013.01); *G01C 21/3848* (2020.08); *G06V 20/58* (2022.01)

(58) Field of Classification Search
CPC .... G06V 20/58; G06V 20/582; G06V 20/588; G06V 20/584; G06V 20/56; G06V 10/82;
(Continued)

(56) References Cited

U.S. PATENT DOCUMENTS

2018/0225968 A1* 8/2018 Wang .................. G01C 21/30
2019/0202462 A1* 7/2019 Wu ..................... B60W 40/105
(Continued)

FOREIGN PATENT DOCUMENTS

KR 10-2020-0065875 A 6/2020

*Primary Examiner* — Nimesh Patel
(74) *Attorney, Agent, or Firm* — Fox Rothschild LLP

(57) ABSTRACT

An apparatus for recognizing a driving lane based on multiple sensors is provided. The apparatus includes a first sensor configured to calculate road information, a second sensor configured to calculate moving obstacle information, a third sensor configured to calculate movement information of a vehicle, and a controller configured to remove the moving obstacle information from the road information to extract only road boundary data, accumulate the road boundary data to calculate a plurality of candidate location information on the vehicle based on the movement information, and select final candidate location information from the plurality of candidate location information.

19 Claims, 15 Drawing Sheets

(51) Int. Cl.
*G01C 21/36* (2006.01)
*G06V 20/58* (2022.01)

(58) Field of Classification Search
CPC ...... G06V 10/24; G06V 10/242; G06V 10/94;
G06V 2201/08; G06V 30/194; G06V
10/25; G06V 20/54; G06V 20/63; G06V
20/64; G06V 2201/10; G06V 2201/12;
B60R 1/00; B60R 1/04; B60R 2300/102;
B60R 2300/30; B60R 2001/1253; B60R
2021/01259; B60R 2001/1215; B60R
2300/106; B60R 2300/301; B60R
2300/70; B60R 2001/1223; B60R
2300/302; B60R 2300/802; B60R
2300/8073; B60R 2300/105; B60R
2300/303; B60R 2300/50; B60R
2300/605; B60R 2300/607; B60R
2300/806; B60R 2300/8066; B60R
21/0134; G05D 1/0246; G05D 1/0088;
G05D 1/0221; G05D 1/0231; G05D
2201/0213; G05D 1/0257; G05D 1/0278;
G05D 1/0287; G05D 1/02; G05D 1/0214;
G05D 1/0223; G05D 1/0251; G05D
1/0253; G05D 2201/0212; B60W 30/09;
B60W 2420/52; B60W 50/14; B60W
2420/42; B60W 10/20; B60W 2554/00;
B60W 2554/4041; B60W 30/02; B60W
30/12; B60W 2554/80; B60W 30/16;
B60W 30/18163; B60W 2554/801; B60W
2540/10; B60W 2540/12; B60W 2540/18;
B60W 2552/30; B60W 2552/53; B60W
30/095; B60W 30/10; B60W 60/0015;
B60W 10/06; B60W 2510/18; B60W
2540/227; B60W 2552/05; B60W
2552/15; B60W 2552/20; B60W 30/08;
B60W 30/0953; B60W 30/143; B60W
2420/403; B60W 2554/40; B60W 50/04;
B60W 50/06; B60W 50/08; B60W 40/06;
B60W 60/00; B60W 2050/143; B60W
2050/146; B60W 2420/40; B60W
2420/54; B60W 2420/62; B60W 40/10;
B60W 2420/00; B60W 2520/10; B60W
2530/18; B60W 2552/50; B60W 2556/40;
G06N 3/045; G06N 3/08; G06N 3/04;
G06N 3/044; G06N 3/084; G06N 20/00;
G06N 3/048; G06N 3/086; G06N 3/082;
G06N 7/01; G06T 1/20; G06T
2207/30256; G06T 2207/20084; G06T
2207/30252; G06T 2207/20081; G06T
2207/10016; G06T 7/80; G06T
2207/30261; G06T 2207/10004; G06T
2207/30236; G06T 7/20; G06T
2207/30248; G06T 7/0012; G06T 7/70;
G06T 13/20; G06T 13/40; G06T
2207/20076; G06T 2207/30004; G06T
2207/30241; G06T 7/00; G06T 7/246;
G06T 7/344; G08G 1/16; G08G 1/166;
G08G 1/165; G08G 1/096725; G08G
1/01; G08G 1/00; G08G 1/0133; G08G
1/162; G01C 21/3658; G01C 21/3848;
G01C 21/26; B60Y 2300/08; B60Y
2400/30
See application file for complete search history.

(56) References Cited

U.S. PATENT DOCUMENTS

| | | | |
|---|---|---|---|
| 2019/0228571 A1* | 7/2019 | Atsmon | G01C 21/3815 |
| 2020/0064855 A1* | 2/2020 | Ji | G05D 1/0214 |
| 2020/0094825 A1* | 3/2020 | Kato | G06V 20/58 |
| 2020/0109954 A1* | 4/2020 | Li | G01C 21/3852 |
| 2021/0206389 A1* | 7/2021 | Kim | G01C 21/3415 |

* cited by examiner

APPARATUS AND METHOD FOR RECOGNIZING DRIVING LANE BASED ON MULTIPLE SENSORS

CROSS-REFERENCE(S) TO RELATED APPLICATIONS

This application claims priority to Korean Patent Application No. 10-2020-0150903, filed on Nov. 12, 2020, which is incorporated herein by reference in its entirety.

TECHNICAL FIELD

The present disclosure relates to an apparatus and a method for recognizing a driving lane based on multiple sensors.

BACKGROUND

A technique for implementing a demonstration autonomous vehicle using expensive global navigation satellite systems (GNSS)/inertial navigation system (INS) is being studied. In particular, in the case of autonomous driving, position recognition in a lateral direction is performed utilizing the INS and landmarks on a road, such as road markings, lanes, traffic lights, and road signs, using a camera.

However, in the case of the autonomous driving, position recognition in a transverse direction is important. To this end, a technology for synthetically recognizing a driving lane and a position within a lane is required. In addition, in order to recognize the driving lane, road boundary detection is required.

However, the road boundary detection has a problem of being inaccurate due to weather, types of obstacles, and characteristics of sensors.

In addition, it may be undesirable to apply the GNSS/INS to autonomous vehicles for mass production.

SUMMARY

The present disclosure is directed to an apparatus and a method for recognizing a driving lane based on multiple sensors, which may improve performance of precise positioning on a road through a technique for road boundary detection and driving lane recognition on the basis of fusion of a low-cost global positioning system (GPS), multiple environment recognition sensors, and a precision map.

Other objects and advantages of the present disclosure can be understood by the following description and become apparent with reference to some forms of the present disclosure. Also, it is obvious to those skilled in the art to which the present disclosure pertains that the objects and advantages of the present disclosure can be realized by the means as claimed and combinations thereof.

In some forms of the present disclosure, there is provided an apparatus for recognizing a driving lane based on multiple sensors, which improves performance of precise positioning on a road through a technique for road boundary detection and driving lane recognition on the basis of fusion of a low-cost GPS, multiple environment recognition sensors, and a precision map.

The apparatus for recognizing a driving lane includes a first sensor configured to calculate road information; a second sensor configured to calculate moving obstacle information; a third sensor configured to calculate movement information of a vehicle; and a controller configured to remove the moving obstacle information from the road information to extract only road boundary data, accumulate the road boundary data to calculate pieces of candidate location information on the vehicle on the basis of the movement information, and select one among the pieces of candidate location information as final candidate location information.

In this case, the road boundary data may be extracted from a plurality of previous frames using the movement information and accumulated in a current frame.

In addition, the pieces of candidate location information may be calculated using driving lane information obtained using a fourth sensor or precision map lane information which is set in advance on the basis of current vehicle location information.

In addition, the pieces of candidate location information may be calculated based on a grid formed by dividing a predetermined region of interest placed on a map road boundary of the precision map lane information at regular intervals.

In addition, the grid may be formed of a plurality of lateral directions and a plurality of transverse directions, and all of the plurality of lateral directions and the plurality of transverse directions may be set as pieces of transverse candidate location information and pieces of lateral candidate location information.

In addition, the grid may be formed of a plurality of heading angles, the plurality of heading angles may be generated by dividing the region of interest at regular intervals based on a center point of the vehicle, and all the plurality of heading angles may be set as candidate heading angle information.

In addition, the number of pieces of candidate location information may be obtained by multiplying the number of pieces of lateral location information, the number of pieces of transverse location information, and the number of pieces of heading angle location information.

In addition, the pieces of candidate location information may consist of only of a preset number of pieces of transverse candidate location information based on the transverse direction in consideration of a location error of the vehicle.

In addition, a location of the vehicle present within one road boundary may be determined according to a ratio of a lateral offset calculated between a driving lane and a center of the vehicle.

In addition, a preset number of the pieces of transverse candidate location information for each lane may be determined according to the ratio of the lateral offset on the basis of a lane position and the number of lanes which are identified in a region of interest set in advance in the precision map lane information.

In addition, a heading angle of each of a preset number of the pieces of transverse candidate location information may be calculated using a difference value between a first average of a heading angle of a left lane and a heading angle of a right lane in front of the vehicle, which are recognized through the second sensor, and a second average of a heading angle of the left lane and a heading angle of the right lane of a preset number of the pieces of transverse candidate location information which are calculated through the precision map lane information.

In addition, the controller may match precision map road boundary information searched on the basis of the pieces of candidate location information with the accumulated road boundary data to assign a matching degree score to each of the pieces of candidate location information and select a lane of the final candidate location information, to which a highest matching degree score is assigned, as the driving lane.

In addition, the controller may convert the precision map road boundary information and the accumulated road boundary data into a coordinate system formed of Y-axis coordinates and X-axis coordinates and compare only values of the X-axis coordinates on the basis of an index of the Y-axis coordinates to calculate the matching degree score.

In addition, the matching degree score may be calculated using the number of data points located in the vicinity of the precision map road boundary information, the data points may be generated by the first sensor, and the number of data points may be the number of left points, the number of right points, and the number of points between road boundaries on the basis of the precision map road boundary information.

In addition, when the number of previous frames is larger than a preset value, the controller may remove one farthest previous frame and add one current frame to keep an accumulated number of frames constant.

In addition, the accumulated number of frames may be variably set according to a vehicle speed or a movement distance of the vehicle.

In addition, the first sensor may be a distance sensor, the second sensor may be a vision sensor, the third sensor may be a motion sensor, and the fourth sensor may be a global positioning system (GPS) sensor or an image sensor.

In addition, the controller may apply a preset invalid determination condition to the final candidate location information to determine whether the final candidate location information is valid.

In addition, the invalid determination condition may include any one among a comparison condition whether the matching degree score of the final candidate location information is smaller than a preset first matching degree, a comparison condition whether a residual amount of the distance sensor present in the driving lane is greater than a preset second matching degree in the final candidate location information, and a determination condition whether a left lane direction and a right lane direction, which are in front of the vehicle, are parallel to each other is determined according to a difference between the left lane direction and the right lane direction in the final candidate location information and whether the vehicle deviates from a lane width by comparing a difference between a lateral offset of the left lane and a lateral offset of the right lane based on the center of the vehicle with a preset road width.

In some forms of the present disclosure, there is provided a method of recognizing a driving lane based on multiple sensors, which includes a first information calculation operation of calculating, by a first sensor and a second sensor, road information and moving obstacle information; a second information calculation operation of calculating, by a third sensor, movement information of a vehicle; and a selection operation of removing, by a controller, the moving obstacle information from the road information to extract only road boundary data, accumulating the road boundary data to calculate pieces of candidate location information on the vehicle on the basis of the movement information, and selecting one among the pieces of candidate location information as final candidate location information.

In addition, the selection operation may include calculating, by the controller, the piece of candidate location information using precision map lane information preset on the basis of at least one of driving lane information obtained using a fourth sensor and current vehicle location information obtained from a location information acquisition part.

In addition, the selection operation may include matching, by the controller, precision map road boundary information searched on the basis of the pieces of candidate location information with the accumulated road boundary data to assign a matching degree score to each of the pieces of candidate location information and select a lane of the final candidate location information, to which a highest matching degree score is assigned, as the driving lane.

In addition, the selection operation may include converting, by the controller, the precision map road boundary information and the accumulated road boundary data into a coordinate system formed of Y-axis coordinates and X-axis coordinates and comparing only values of the X-axis coordinates on the basis of an index of the Y-axis coordinates to calculate the matching degree score.

In addition, the selection operation may include applying, by the controller, a preset invalid determination condition to the final candidate location information to determine whether the final candidate location information is valid.

DRAWINGS

DETAILED DESCRIPTION

Figure 1:
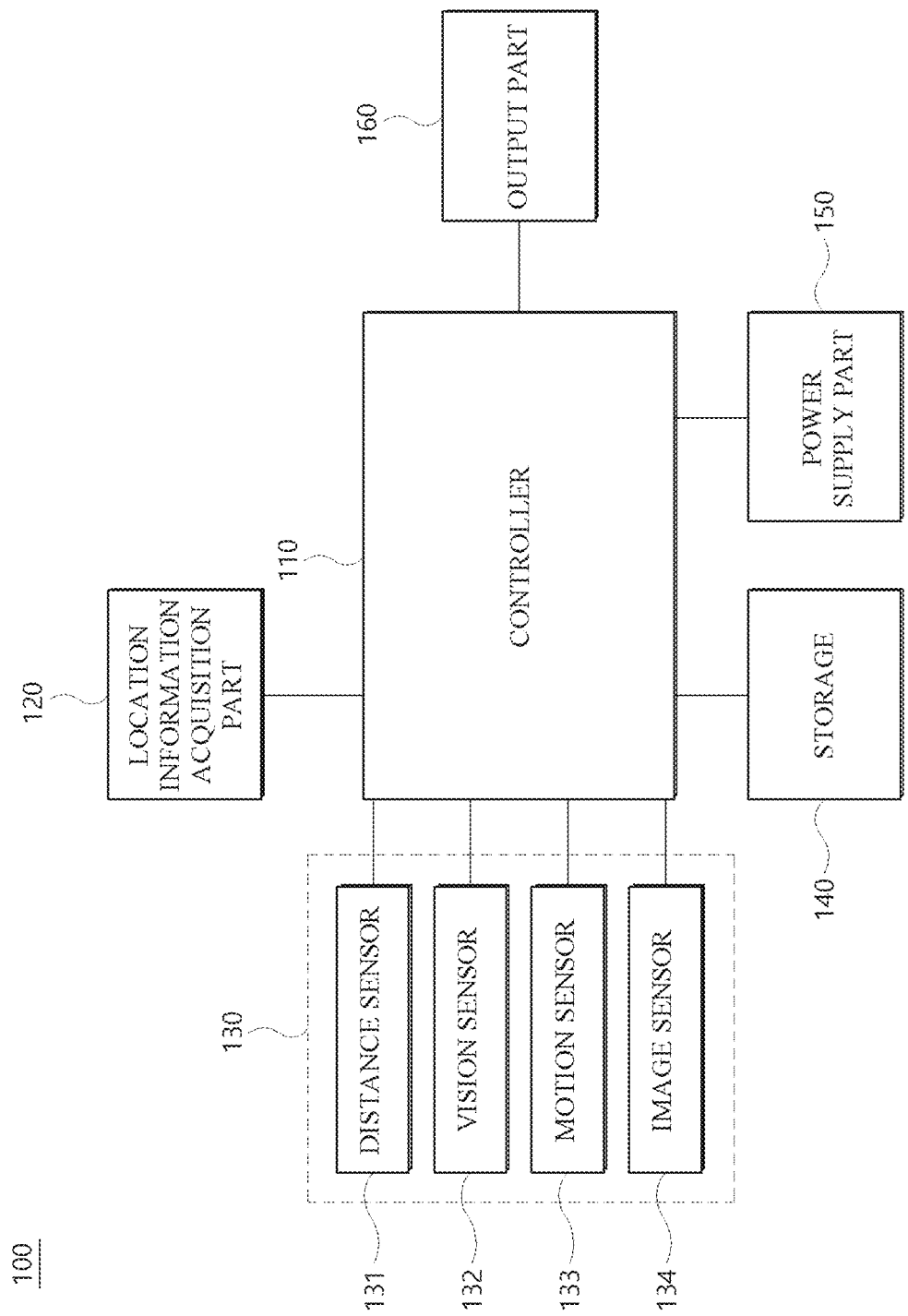
FIG. 1 is a block diagram illustrating a configuration of an apparatus for recognizing a driving lane based on multiple sensors in some forms of the present disclosure.

The present disclosure may be modified into various forms and may have a variety of forms, and, therefore, specific forms will be illustrated in the drawings and described in detail. The forms, however, are not to be taken in a sense which limits the present disclosure to the specific forms, and should be construed to include modifications, equivalents, or substitutes within the spirit and technical scope of the present disclosure.

In describing each drawing, similar reference numerals are assigned to similar components. Although the terms "first," "second," and the like may be used herein to describe various components, these components should not be limited by these terms. The terms are used only for the purpose of distinguishing one component from another component.

For example, without departing from the scope of the present disclosure, a first component may be referred to as a second component, and similarly, a second component may also be referred to as a first component. The term "and/or" includes a combination of a plurality of related listed items or any item of the plurality of related listed items.

Unless otherwise defined, all terms including technical or scientific terms used herein have the same meaning as commonly understood by those skilled in the art to which the present disclosure pertains.

General terms that are defined in a dictionary shall be construed to have meanings that are consistent in the context of the relevant art and should not be interpreted as having an idealistic or excessively formalistic meaning unless clearly defined in this disclosure.

Hereinafter, an apparatus and a method for recognizing a driving lane based on multiple sensors in some forms of the present disclosure will be described in detail with reference to the accompanying drawings.

FIG. 1 is a block diagram illustrating a configuration of an apparatus 100 for recognizing a driving lane based on multiple sensors in some forms of the present disclosure. Referring to FIG. 1, the apparatus 100 for recognizing a driving lane may include a controller 110, a location information acquisition part 120 for acquiring current location information of a vehicle, a sensor system 130 for calculating information on a road on which the vehicle is traveling, information on a moving obstacle which moves on the road, and movement information of the vehicle traveling on the road, and a storage 140 for storing pieces of information. In addition, the apparatus 100 for recognizing a driving lane may further include a power supply part 150 for supplying power to the above components, and an output part 160 for outputting information. In addition, the components shown in FIG. 1 are mainly described for components for the purpose of the apparatus for recognizing a driving lane based on multiple sensors in some forms of the present disclosure, and other components are merely omitted.

The controller 110 transmits and receives signals to and from the components 120 to 160 and performs a function of controlling the components 120 to 160. In addition, the controller 110 performs a function of removing the moving obstacle information from the road information on the basis of the movement information to extract only road boundary data, accumulating the road boundary data to calculate pieces of candidate location information on the vehicle, and selecting one among the pieces of candidate location information.

The location information acquisition part 120 performs a function of acquiring current location information of the vehicle. Thus, the location information acquisition part 120 may be a global positioning system (GPS) receiver, but the present disclosure is not limited thereto, and the location information acquisition part 120 may be an inertial measurement unit (IMU), a light detecting and ranging (LiDAR), or a radio detecting and ranging (RADAR). In addition, the IMU may include an accelerometer, a tachometer, and the like.

The sensor system 130 may include a distance sensor 131 for sensing a road on which the vehicle is traveling and generating distance information on the road, a vision sensor 132 for generating a moving obstacle which moves on the same road, a motion sensor 133 for sensing movement of the vehicle and generating movement information, and an image sensor 134 for sensing a lane of a road and generating driving lane information.

The distance sensor 131 may be an ultrasonic sensor, an infrared sensor, a time of flight (TOF) sensor, a laser sensor, a LiDAR, or a RADAR.

The vision sensor 132 refers to a sensor for recognizing and evaluating a moving object and a scene.

The motion sensor 133 refers to a motion recognition sensor for recognizing a motion and a position of an object. Thus, the motion sensor 133 may include a sensor for detecting a direction, a sensor for detecting movement, and a sensor for measuring a speed.

The image sensor 134 performs a function of capturing a lane on a general road. The image sensor 134 may be a charge-coupled device (CCD) sensor, a complementary metal-oxide semiconductor (CMOS) sensor, or the like.

The storage 140 performs a function of storing a program having an algorithm for recognizing a driving lane based on multiple sensors, data, software, and the like. The storage 140 may include at least one type of storage medium among a flash type memory, a hard disk type memory, a multimedia card micro type memory, a card type memory (e.g., a secure digital (SD) or extreme digital (XD) memory), a random access memory (RAM), a static random access memory (SRAM), a read only memory (ROM), an electrically erasable programmable read only memory (EEPROM), a programmable read only memory (PROM), a magnetic memory, a magnetic disk, and an optical disk.

The power supply part 150 performs a function of supplying power to components. Thus, the power supply part 150 may be a battery pack formed of rechargeable battery cells, a lead acid battery, or the like.

The output part 160 performs a function of outputting a processing process of recognizing a driving lane to a screen. In addition, the output part 160 may also output processed data to the controller 110. To this end, the output part 160 may include a liquid crystal display (LCD), a light emitting diode (LED) display, an organic LED (OLED) display, a touch screen, a flexible display, a head-up display (HUD), and the like. The touch screen may be used as an input part. In addition, a sound system for inputting and/or outputting a voice, a sound, or the like may be configured.

Figure 2:
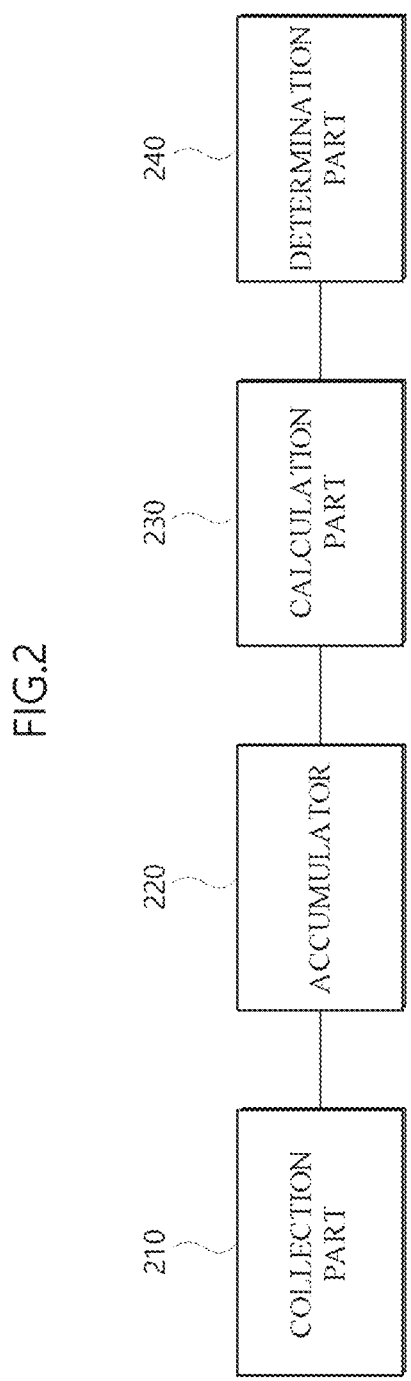
FIG. 2 is a detailed block diagram illustrating a configuration of a controller shown in FIG. 1.

FIG. 2 is a detailed block diagram illustrating a configuration of the controller 110 shown in FIG. 1. Referring to FIG. 2, the controller 110 may include a collection part 210 for collecting sensing data generated from the sensor system 130, an accumulator 220 for accumulating road boundary data extracted from a previous frame in a current frame using the movement information of the vehicle, a calculation part 230 for calculating candidate locations of the vehicle to be placed in each lane using driving lane information and precision map lane information obtained on the basis of location information and for assigning scores to the candidate locations to select a lane of a candidate location with a high score as a driving lane, and a determination part 240 for performing a function of processing an exception for an unusual situation which may occur in a real road.

The collection part 210, the accumulator 220, the calculation part 230, and the determination part 240 may be implemented in software and/or hardware so as to perform the above functions. The hardware may be implemented with an application specific integrated circuit (ASIC) designed to perform the above functions, a digital signal processor (DSP), a programmable logic device (PLD), a field programmable gate array (FPGA), a processor, a microprocessor, another electronic unit, or a combination thereof. Software implementation may include a software configuration component (element), an object-oriented software configuration component, a class configuration component and a work configuration component, a process, a function, an attribute, a procedure, a subroutine, a segment of a program code, a driver, firmware, a microcode, data, database, a data structure, a table, an array, and a variable. The software and the data may be stored in a memory and executed by a processor. The memory or the processor may employ various parts well known to those skilled in the art.

Figure 3:
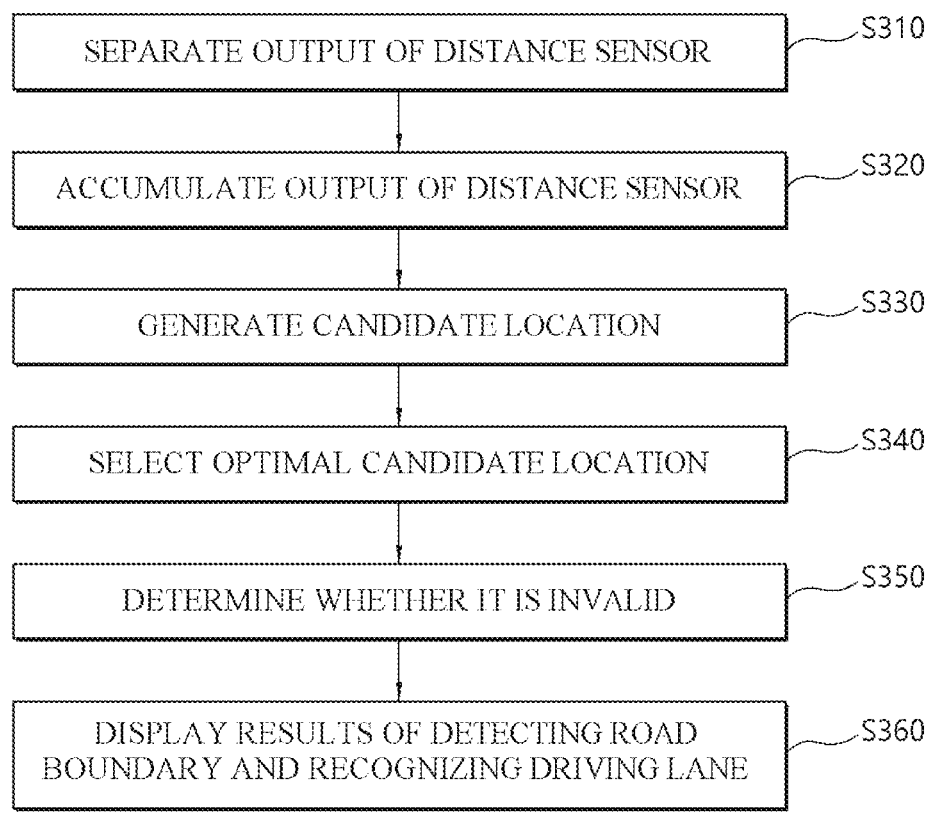
FIG. 3 is a flowchart illustrating a process of recognizing a driving lane based on multiple sensors in some forms of the present disclosure.

FIG. 3 is a flowchart illustrating a process of recognizing a driving lane based on multiple sensors in some forms of the present disclosure. Referring to FIG. 3, the collection part 210 of the controller 110 removes a surrounding vehicle corresponding to a moving obstacle from an output of the distance sensor 131 and extracts only road boundary data (S310). In other words, moving obstacle information is removed from road information calculated by the distance sensor 131, and thus only road boundary information is extracted. In order to generate the moving obstacle information, the vision sensor 132 may be used.

Thereafter, the accumulator 220 of the controller 110 accumulates the road boundary data extracted from N (>1) previous frames in a current frame using movement information of the vehicle obtained from an output of the motion sensor 133 (S320).

Then, the calculation part 230 of the controller 110 searches transverse candidate location information of an own vehicle to be placed in each lane using precision map lane information obtained on the basis of driving lane information acquired from the image sensor 134 and current vehicle location information acquired from the location information acquisition part 120 (S330).

The precision map lane information is stored in the storage 140 in advance. Alternatively, the precision map lane information may be supplied from the outside through communication. That is, since a location at which the vehicle is currently traveling is determined, the transverse candidate location information is searched using latest precision map information corresponding to the determined location. To this end, the precision map information may be stored in a database. In addition, the lane information and the road boundary information may be included in the precision map information.

In addition, the precision map lane information may be obtained on the basis of both the driving lane information acquired from the image sensor 134 and the current vehicle location information acquired from the location information acquisition unit 120 or may be selectively obtained on the basis of only one of the driving lane information and the current vehicle location information.

Thereafter, the calculation part 230 of the controller 110 matches the precision map road boundary information obtained on the basis of the candidate location to an output of the road boundary information accumulated in S320 to give a score to each candidate location. As a result, a lane of a candidate location with the highest score is selected as a driving lane. When the matching is performed at a position of the driving lane, distance sensor data of a position close to a precision map road boundary may be detected as a road boundary.

Thereafter, the determination part 240 determines whether selected optimal candidate location information is invalid using the function of processing an exception with respect to a specific situation which may occur in an actual driving lane (S350).

Thereafter, the determination part 240 displays the results of detecting the road boundary and recognizing the driving lane through the output part 160 (S360). The result information may be output as a combination of graphics, a text, and a voice.

Figure 4:
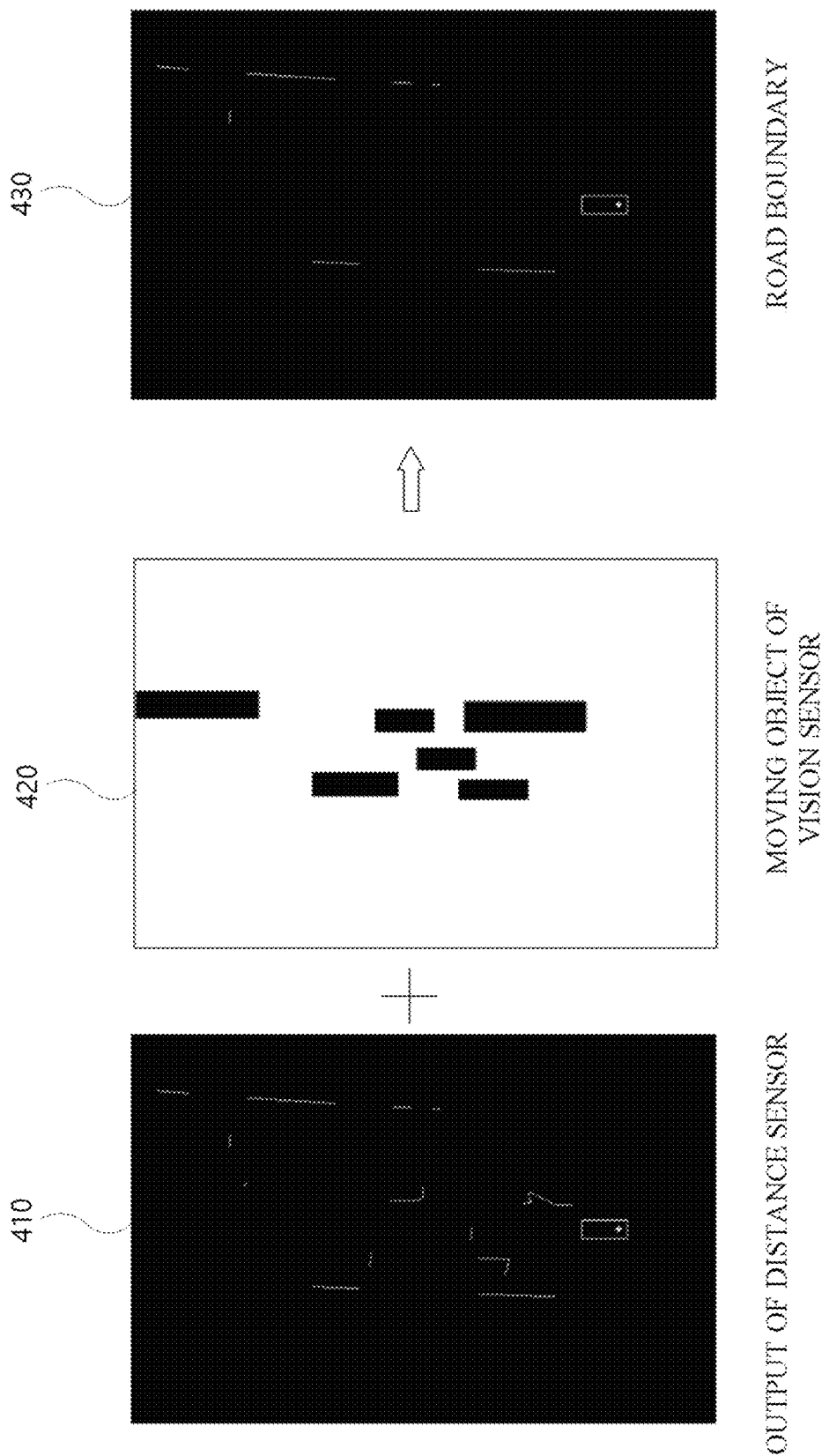
FIG. 4 is a diagram for describing a concept of an operation of separating an output of a distance sensor shown in FIG. 3.

FIG. 4 is a diagram for describing a concept of the separating of the output of the distance sensor (S310) shown in FIG. 3. That is, FIG. 4 is a flowchart of extracting only a road boundary part of all pieces of data detected by the distance sensor 131 using the resultant recognized by the vision sensor 132.

Referring to FIG. 4, a difference between the distance sensor data and vision sensor data is measured with respect to a moving object in advance, modeled, and stored as a database in the storage 140.

Thereafter, the modeling result is reflected to a position and a size of the moving obstacle recognized by the vision sensor 132 and converted in the form of an occupancy grid map. In this case, a value of 0 may be assigned to the moving obstacle and a value of 1 may be assigned to other areas.

Meanwhile, the output of the distance sensor 131 is also converted in the form of an occupancy grid map. In this case, a value of 1 may be assigned to a sensor output position and a value of 0 may be assigned to other areas.

In a process of fusing the sensors, a road boundary map 430 is calculated by performing an AND operation on a distance sensor map 410 and a vision sensor map 420 in grid units. As a result, the moving obstacle is removed from a distance sensor output, and only a static object corresponding to the road boundary is obtained.

Alternatively, a distance sensor for separating a moving obstacle from a static object and outputting the separation result may be used. That is, a plurality of distance sensors may be configured, and thus some of the plurality of distance sensors may be used to sense only moving obstacles and the remaining thereof may be used to sense only static objects.

Figure 5:
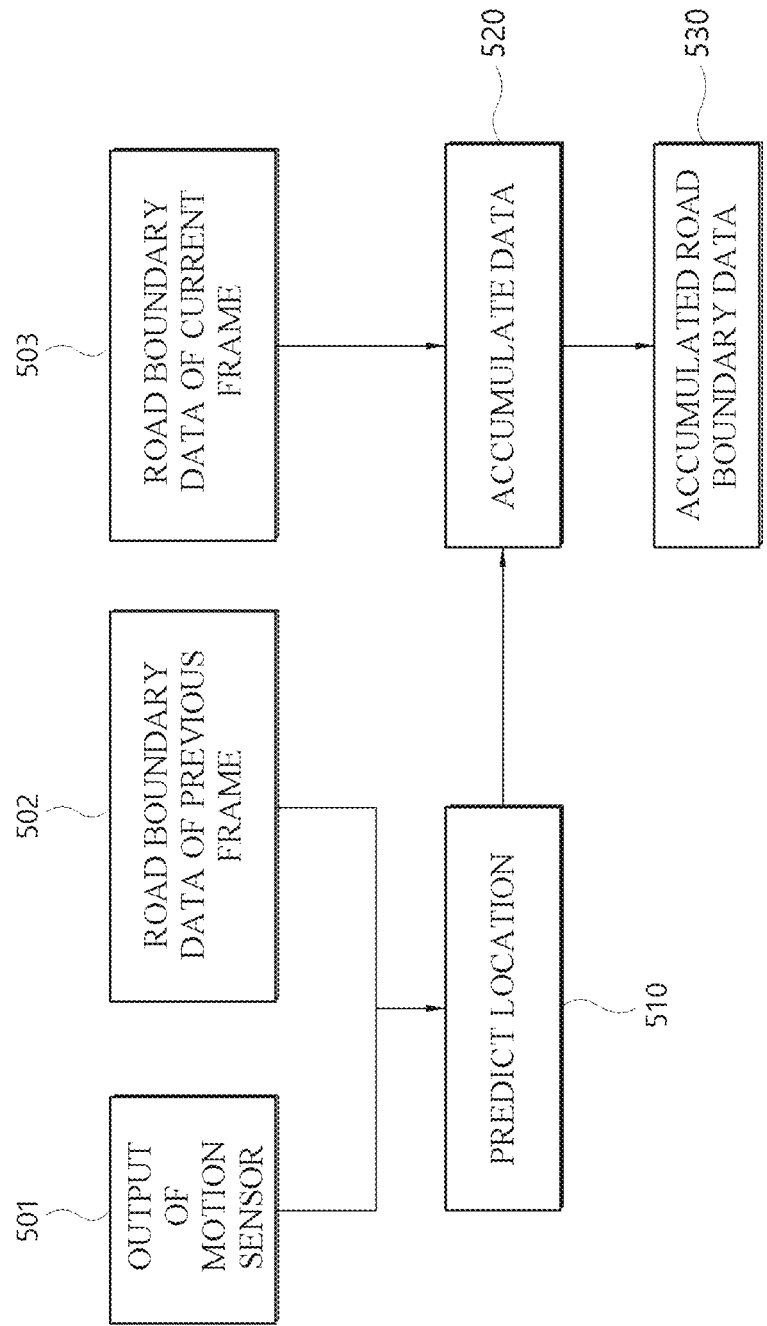
FIG. 5 is a diagram for describing a concept of the operation of accumulating an output of a distance sensor shown in FIG. 3.

FIG. 5 is a diagram for describing a concept of the operation of accumulating an output of a distance sensor shown in FIG. 3. That is, FIG. 5 shows a concept in which pieces of data of a previous frame are accumulated in a current frame. Referring to FIG. 5, the concept is as follows.

1) The number of frames to be accumulated is set. In this case, a fixed number of N (>0) may be set.

2) Location prediction (510) is required with respect to where the N pieces of previous frame data 502 are located in the current frame (i.e., a section). The location prediction may be calculated by applying vehicle speed and angular velocity information (501), which is output from the motion sensor 133, to a constant turn rate and velocity (CTRV) model. Generally, a frame is formed of a plurality of fields. In this case, previous frame data is placed in a data field of a current frame.

3) Accumulated road boundary data is obtained by accumulating road boundary data of the current frame and pieces of road boundary data of previous frames (520 and 530). When the accumulation is performed, when the number of previous frames is greater than the set value of N, one farthest previous frame is removed and the data of the current frame is added to keep the accumulated number constant.

The road boundary data is increased through the above accumulation.

Meanwhile, the number of frames to be accumulated may be variably set according to a vehicle speed or a movement distance. In addition, when the number of frames is set to the vehicle speed, the accumulated number is set to be smaller at a low speed and to be greater at a high speed. Since the low speed is mainly due to traffic jams, it is difficult to sufficiently secure the road boundary data due to surrounding vehicles.

Figure 6:
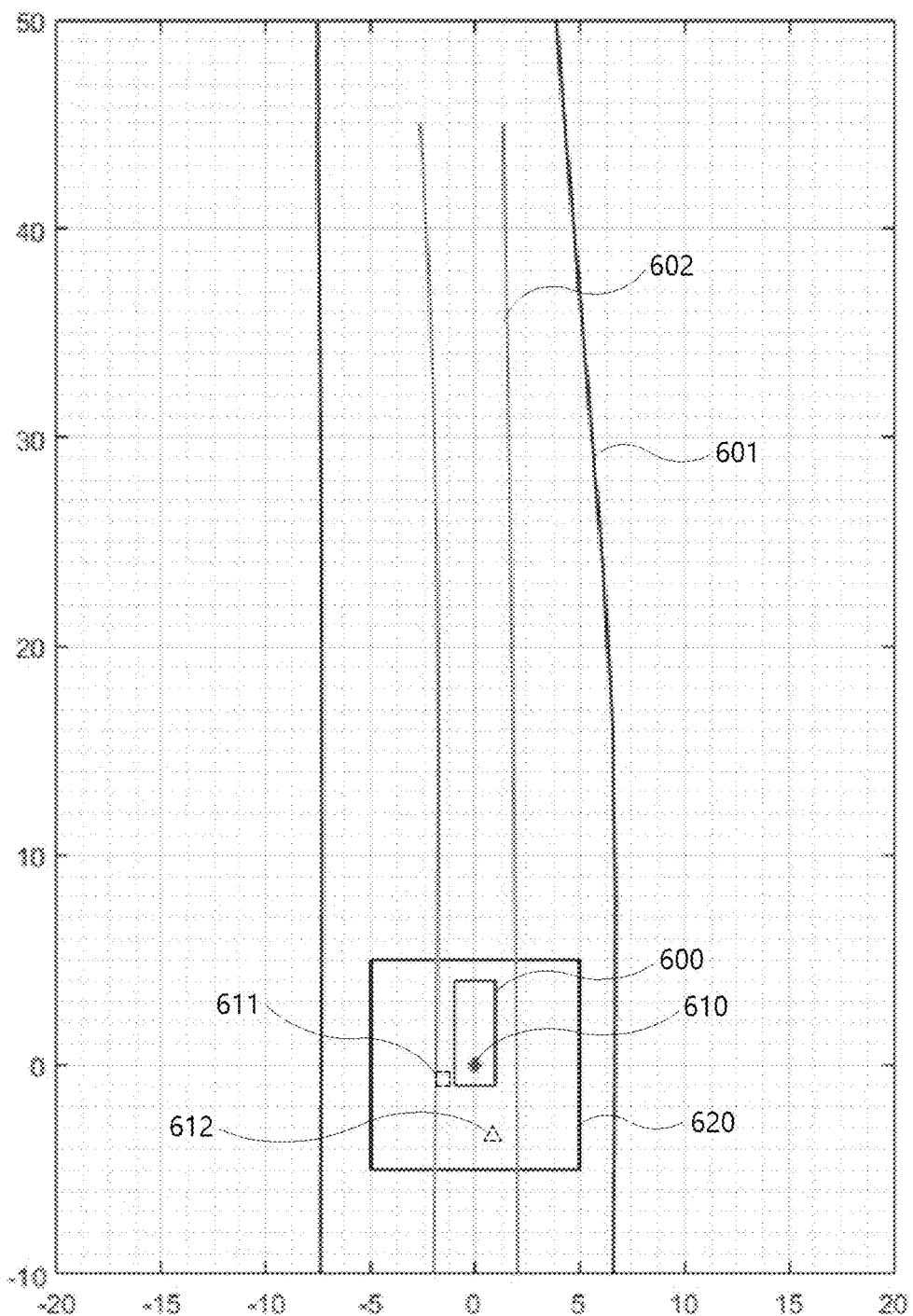
FIG. 6 is a diagram for describing a concept of an operation of generating candidate locations shown in FIG. 3.

FIG. 6 is a diagram for describing a concept of the operation of generating candidate locations (S330) shown in FIG. 3. That is, FIG. 6 is a conceptual diagram illustrating generation of a candidate location on a three dimension, which consists of lateral/transverse locations and heading angle location information on the basis of a grid search. Referring to FIG. 6, a cross 610 indicates a center of an own vehicle, a rectangle 600 indicates the own vehicle, and a square 620 including the own vehicle indicates a region of interest which is a range so as to search for a location of the own vehicle in lateral/transverse directions. In addition, the rectangle 600 indicates a location of the own vehicle, which is determined by GPS, a small dotted rectangle 611 indicates a location of the own vehicle, which is determined by emergency vehicle preemption (EVP), and a small dotted triangle 612 indicates a location of the own vehicle, which is determined by RT3002. Here, RT3002 is a model name of an intertial & GPS measurement system.

Generally, the location of the vehicle is determined by lateral/transverse locations and a heading angle. The set region of interest 620 is divided at regular intervals with respect to the lateral/transverse locations, all lateral/transverse locations generated during the division are set as candidate locations. For example, when the candidate locations are indicated as coordinates, the coordinates may be (50, 50), (−50, 50), (−50, 50), and (50, −50).

In addition, in FIG. 6, driving lane information 602 and map road boundary 601 which are obtained using the image sensor 134 are shown.

Figure 7:
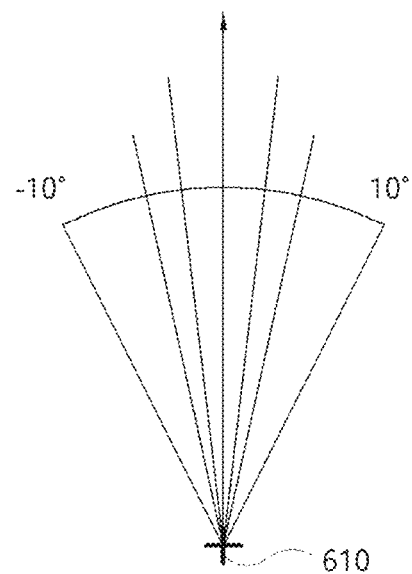
FIG. 7 is a conceptual diagram illustrating an example of generating a heading angle candidate within a predetermined range according to FIG. 6.

FIG. 7 is a conceptual diagram illustrating an example of generating a heading angle candidate within a predetermined range according to FIG. 6. Referring to FIG. 7, a set range (e.g., left and right sides±10°) is divided at regular intervals with respect to heading angle position information, and all heading angles generated during the division are set as candidate heading angles. The number of generated candidate locations becomes (the number of pieces of lateral location information×the number of pieces of transverse location information×the number of pieces of heading angle location information).

The center of the own vehicle is obtained on the basis of a GPS position, and a basic heading angle also becomes a heading angle obtained from the GPS. A range of the candidate locations may be set in consideration of a GPS location error, and a search interval may be set according to an experiment in consideration of precision.

Figure 8:
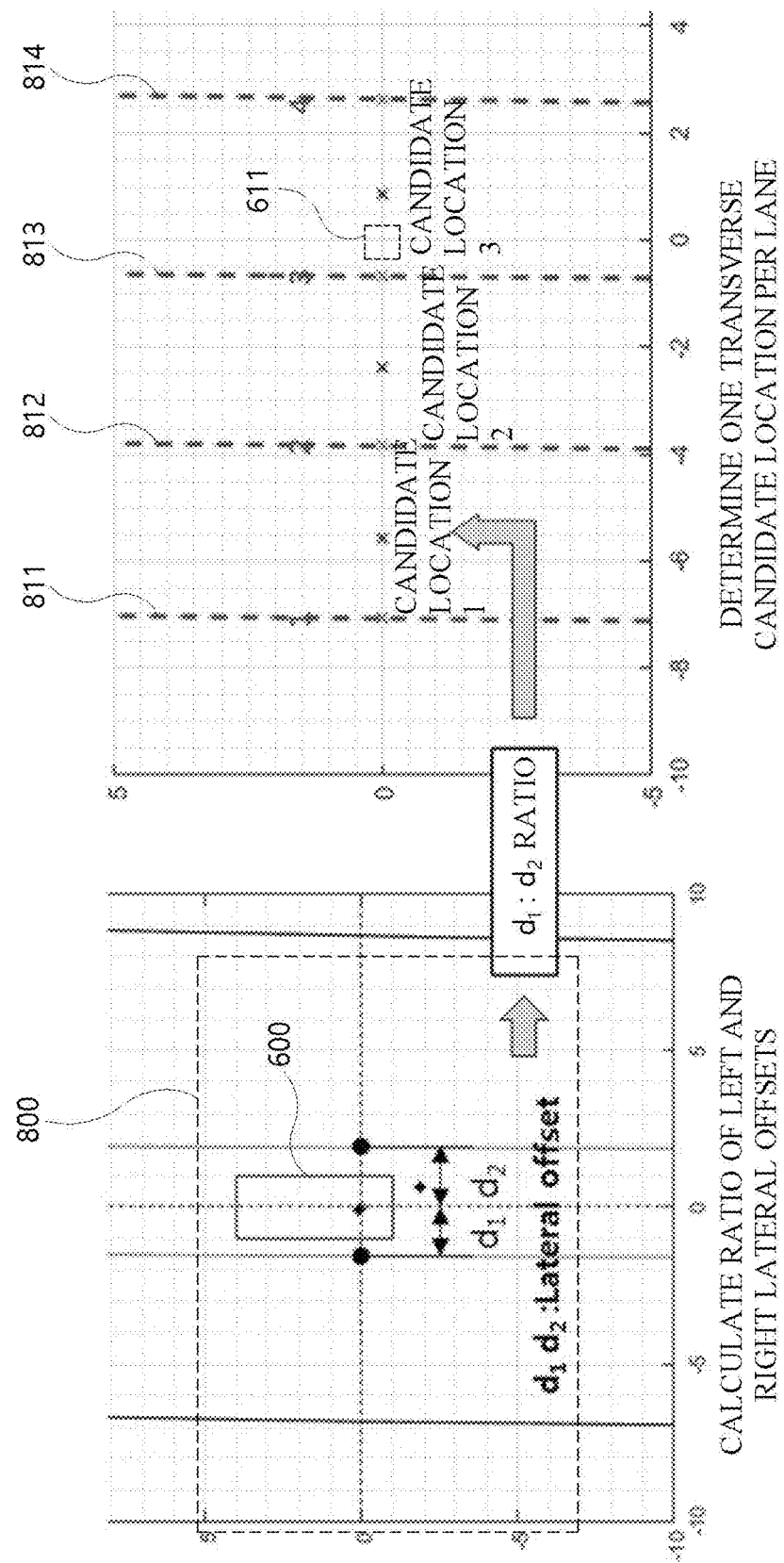
FIG. 8 is a conceptual diagram illustrating another example of generating a candidate location according to FIG. 6.

FIG. 8 is a conceptual diagram illustrating another example of generating a candidate location according to FIG. 6. FIG. 8 is a conceptual diagram illustrating a setting of only a few transverse candidate locations using the precision map lane information and the driving lane information recognized by the vision sensor 132. Referring to FIG. 8, a process of the setting is as follows.

1) A range of region of interest 800 in which candidate locations are to be set in the transverse direction is set in consideration of the GPS location error. A size of the region of interest 800 may be about 20 m×10 m. Although omitted from FIG. 8, precision map lanes (not shown) are present in the map road boundary 601.

2) A lateral offset between the driving lane recognized by the vision sensor 132 and the center of the own vehicle is calculated, and the location of the own vehicle positioned within one lane is determined according to a ratio of the lateral offset.

3) Locations and the number of lanes entering the region of interest are determined at the precision map boundary obtained based on the GPS, and pieces of transverse candidate location information 811, 812, 813, and 814 are searched at the ratio of the lateral offset for each lane.

Figure 9:
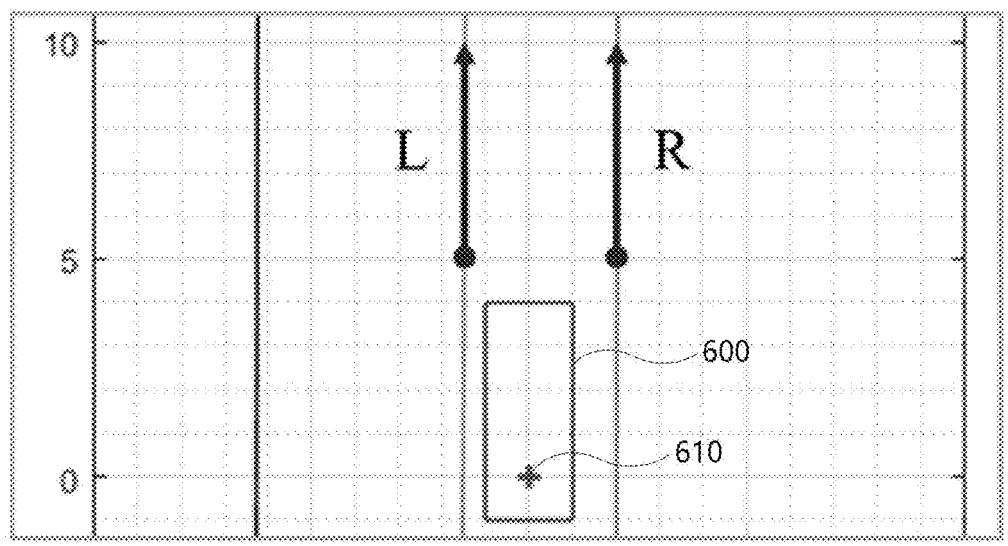
FIG. 9 is a conceptual diagram for describing a search of a direction of a recognized driving lane according to FIG. 8.

FIG. 9 is a conceptual diagram for describing a search of a direction of a recognized driving lane according to FIG. 8. FIG. 9 is a conceptual diagram for describing a search of a direction of a driving lane recognized by the vision sensor 132. Referring to FIG. 9, left and right lanes L and R within a range from 5 to 10 m in a front side are obtained, each heading angle is calculated, and an average of the two heading angles is calculated. As a result, the direction of the driving lane recognized by the vision sensor 132 may be determined.

Figure 10:
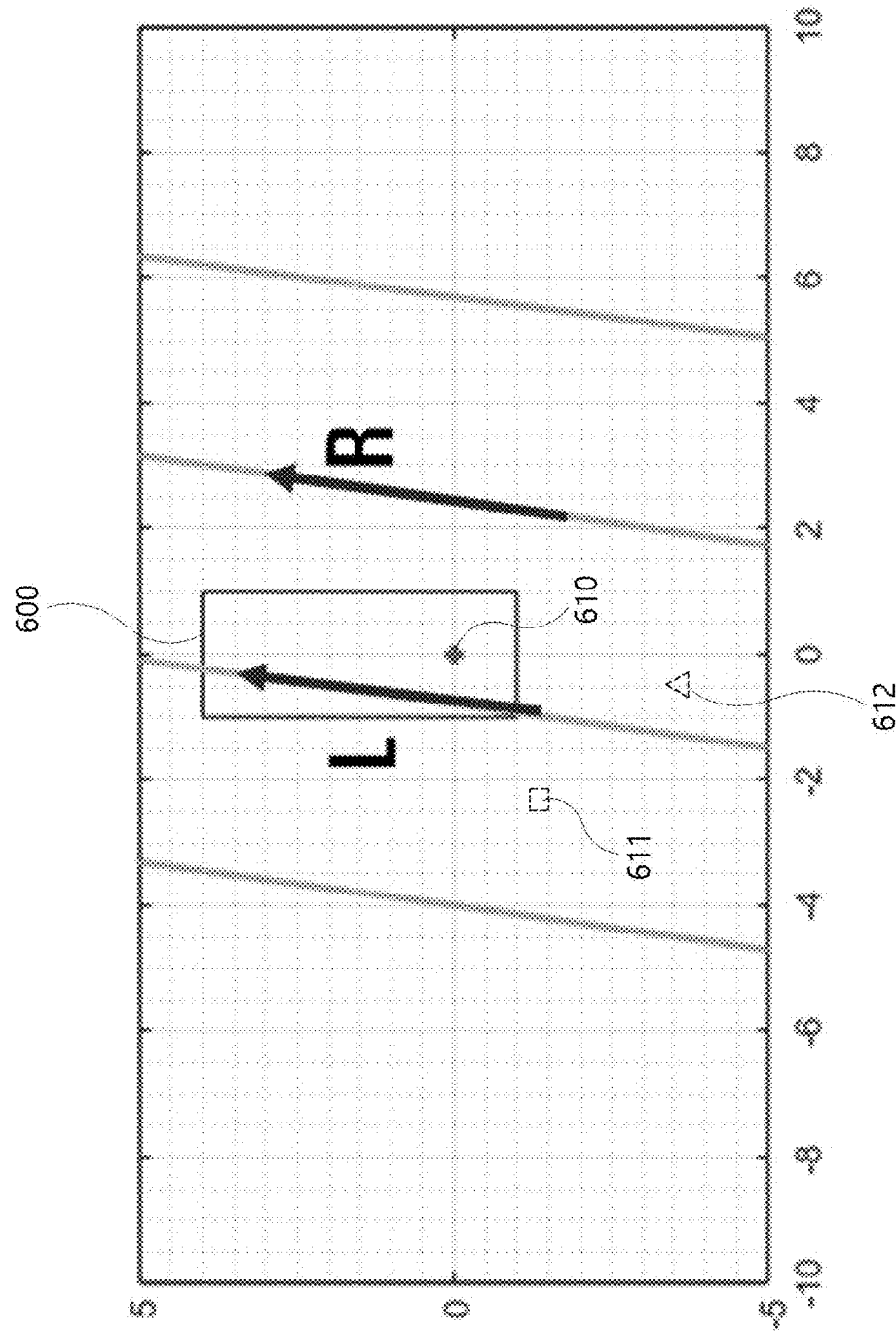
FIG. 10 is a conceptual diagram for describing a search of a heading angle of a precision map according to FIG. 8.

FIG. 10 is a conceptual diagram for describing a search of a heading angle of a precision map according to FIG. 8. FIG. 10 is a conceptual diagram of a search of a lane direction in the precision map. Referring to FIG. 10, a precision map is obtained on the basis of the transverse direction value, the GPS lateral direction value, and the heading angle of each candidate location information, which are previously calculated, and then heading angles of the left and right lanes L and R are calculated, and an average of the two heading angles is calculated. The heading angles of the left and right lanes corresponding to each candidate position are obtained.

Figure 11:
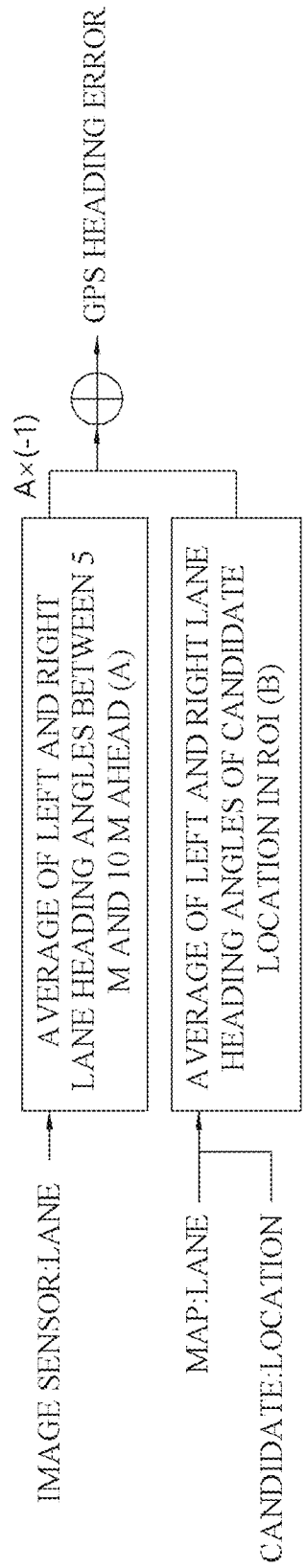
FIG. 11 is a flowchart of calculating a heading angle for each candidate position according to FIGS. 8 to 10.

FIG. 11 is a flowchart of calculating a heading angle for each candidate position according to FIGS. 8 to 10. Referring to FIG. 11, when a difference between the two heading angles obtained as the results of FIGS. 9 and 10 is calculated, a GPS heading angle error is calculated, and when the GPS heading angle error is applied to the GPS heading angle, a heading angle of each candidate position is obtained.

The generation of the candidate locations is performed by searching the transverse candidate locations for each lane and the heading angle of each candidate location. A location provided by the GPS may be directly applied as the lateral direction location.

Figure 12:
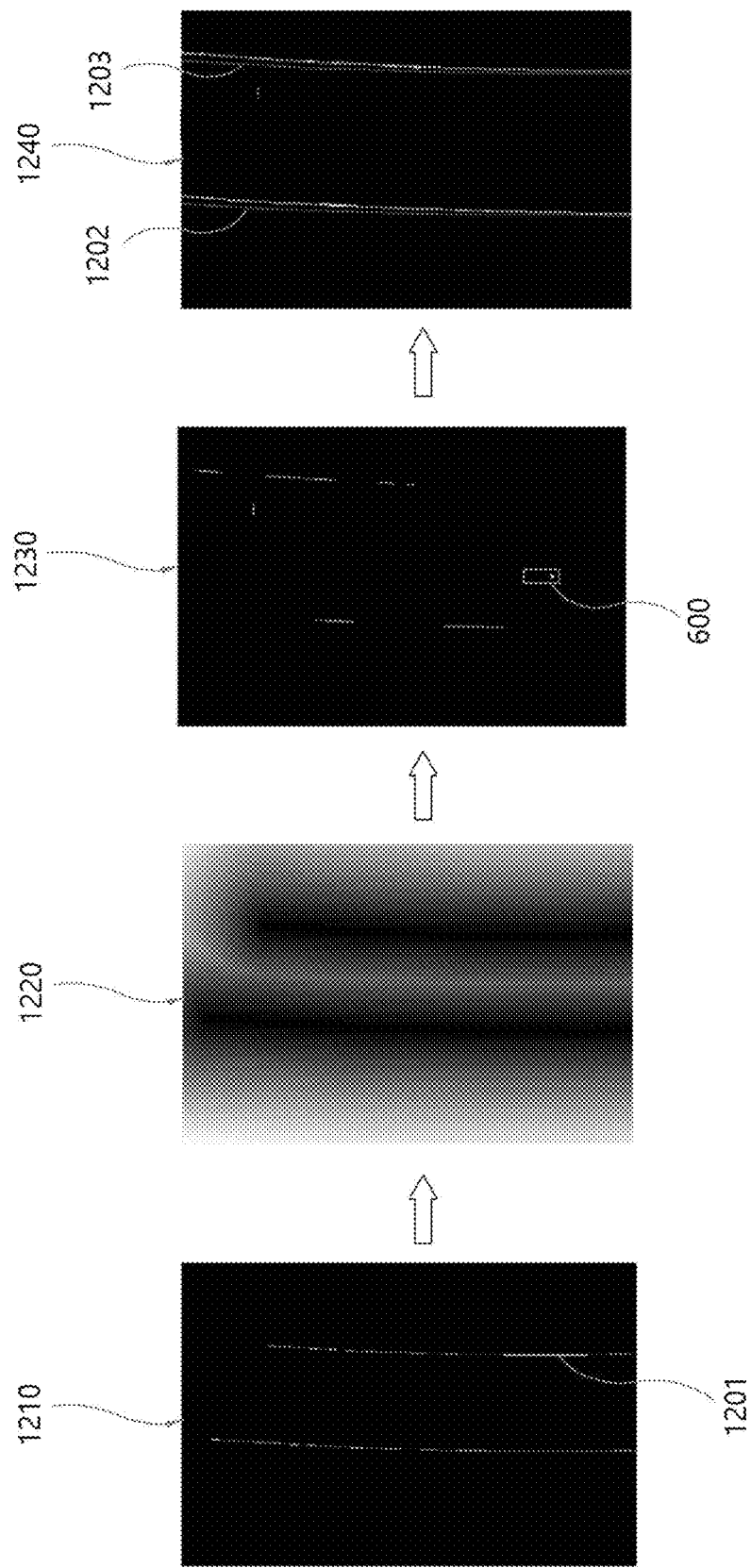
FIG. 12 is a diagram illustrating an example for describing a concept of an operation of selecting an optimal candidate location shown in FIG. 3.

FIG. 12 is a diagram illustrating an example for describing a concept of an operation of selecting an optimal candidate location shown in FIG. 3. That is, FIG. 12 is a flowchart of searching for a location having the highest matching degree to select an optimal candidate location by performing matching between the road boundary of the precision map and the road boundary of the distance sensor 131 on the basis of a distance transform. Referring to FIG. 12, the concept is as follows.

1) A precise map road boundary 1201 is brought to a GPS reference location. Data 1210 is displayed in the form of an occupancy grid map.

2) When a binary image 1220 with respect to the precision map road boundary is generated, a distance transform is applied to the binary image 1220.

3) Road boundary data 1230 of the distance sensor 131 is also brought in the form of an occupancy grid map. Reference points of the two grid maps (the center of the vehicle) are matched, multiplication is performed in grid units, and a distance transform-based matching result 1240 is calculated. A matching score is calculated by calculating an average of values assigned to the matched grid. As the matching score becomes higher, the matching degree becomes higher. In particular, FIG. 12 shows that a candidate location is searched on the basis of a distance transform, and a result is obtained by detecting a precision map road boundary 1203 and a distance sensor road boundary 1202 at a location with the highest matching degree.

4) In order to search for a candidate location, a reference point of a distance transformed image is moved to the candidate location which is set in S330 and the above process 3) is performed to calculate a matching score for each candidate location and search for the location with the highest matching degree.

Figure 13:
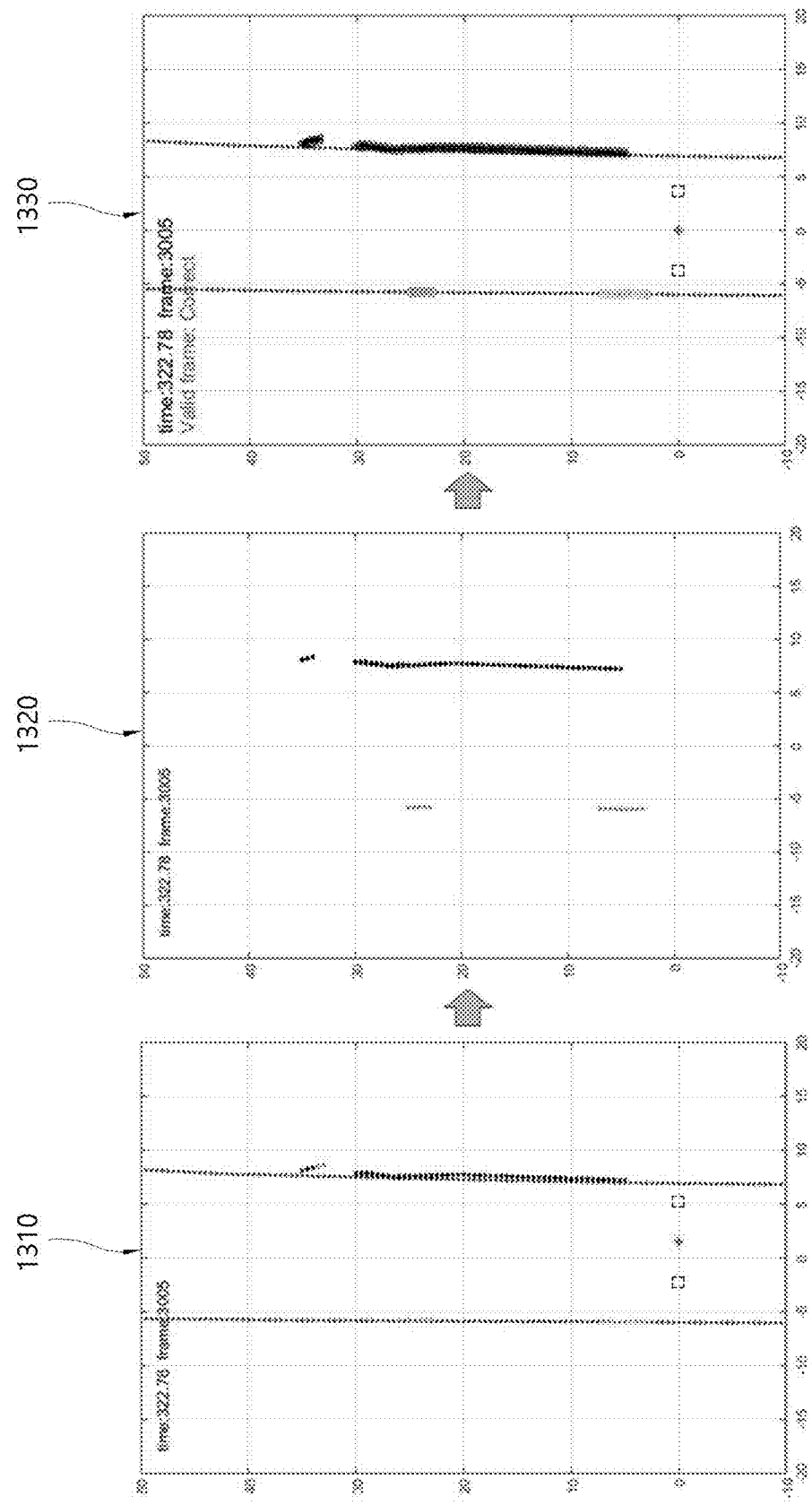
FIG. 13 is a diagram illustrating another example for describing the concept of the operation of selecting an optimal candidate location shown in FIG. 3.

FIG. 13 is a diagram illustrating another example for describing the concept of the operation of selecting an optimal candidate location shown in FIG. 3. FIG. 13 is a conceptual diagram illustrating that a matching degree between the road boundary of the precision map and the road boundary data of the distance sensor 131 is calculated without the occupancy grid map, and a candidate location having the highest matching degree is searched to select an optimal candidate location. Referring to FIG. 13, the concept is as follows.

1) All pieces of data are transformed in the form of an array having Y-axis (lateral axis) coordinate values sampled at regular intervals and X-axis (transverse axis) coordinate values corresponding to the Y-axis coordinate values. In addition, front/rear/left/right regions of interest are set in advance based on the own vehicle.

2) The precision map road boundary data is brought to the candidate location, and the road boundary data of the distance sensor 131 is also brought so that the center of the own vehicle becomes the candidate location.

3) When only X-axis coordinate values of two pieces of data corresponding to the sampled Y-axis coordinate index value are compared so that a data point of the distance sensor 131 is positioned in the vicinity of the precision map road boundary, scores are calculated by as much as the number of points. For example, a road boundary point, an input LiDAR point, a LiDAR point within a right road boundary range, and a LiDAR point within a left road boundary range are displayed. Therefore, a matching degree score is as follows.

Matching degree score=number of left points+number of right points−lnumber of left points-number of right pointsl/2−number of points between road boundaries.

4) The matching degree score is calculated for each set candidate location to search for a candidate location with the highest matching degree.

5) A lane in which a candidate location with a high matching degree is present is recognized as a driving lane (1310). Matching degree scores are given to the candidate locations, and the candidate locations are compared with each other using the matching degree scores.

6) In order to detect the road boundary, an output of the distance sensor 131, which is present in the vicinity of the precision map road boundary, is selected at the candidate location with the high matching degree (1320).

7) Since the selected data of the distance sensor is the data accumulated in S320, a plurality of points are placed at very close locations. An average of adjacent points is calculated to remove excess data.

8) Finally, in order to easily use the distance sensor data in which only the road boundary is detected, points having connectivity are grouped into an object to be finally output (1330). That is, the accumulated points are removed and only the road boundary of the distance sensor data is detected.

In the output of the distance sensor 131 from which the moving object (that is, the moving obstacle) is removed, not only the road boundary is simply included, but also various noises, such as the moving object, and artificial structures, trees, and bushes outside the road boundary, which are not yet removed in S310, are included.

Therefore, in order to remove all the various noises and detect only a pure road boundary or minimize an effect due to noise, when the distance sensor data is matched to the precision map, distance sensor data in the vicinity of the precision map road boundary is selected.

In addition, when a ratio of the number of left points is similar to a ratio of the number of right points, a method of calculating the matching degree score may be designed to assign a higher score. The score is lowered by as much as the number of points remaining in the road boundary so that it is possible to minimize an effect of the moving object which is not yet removed.

Figure 14:
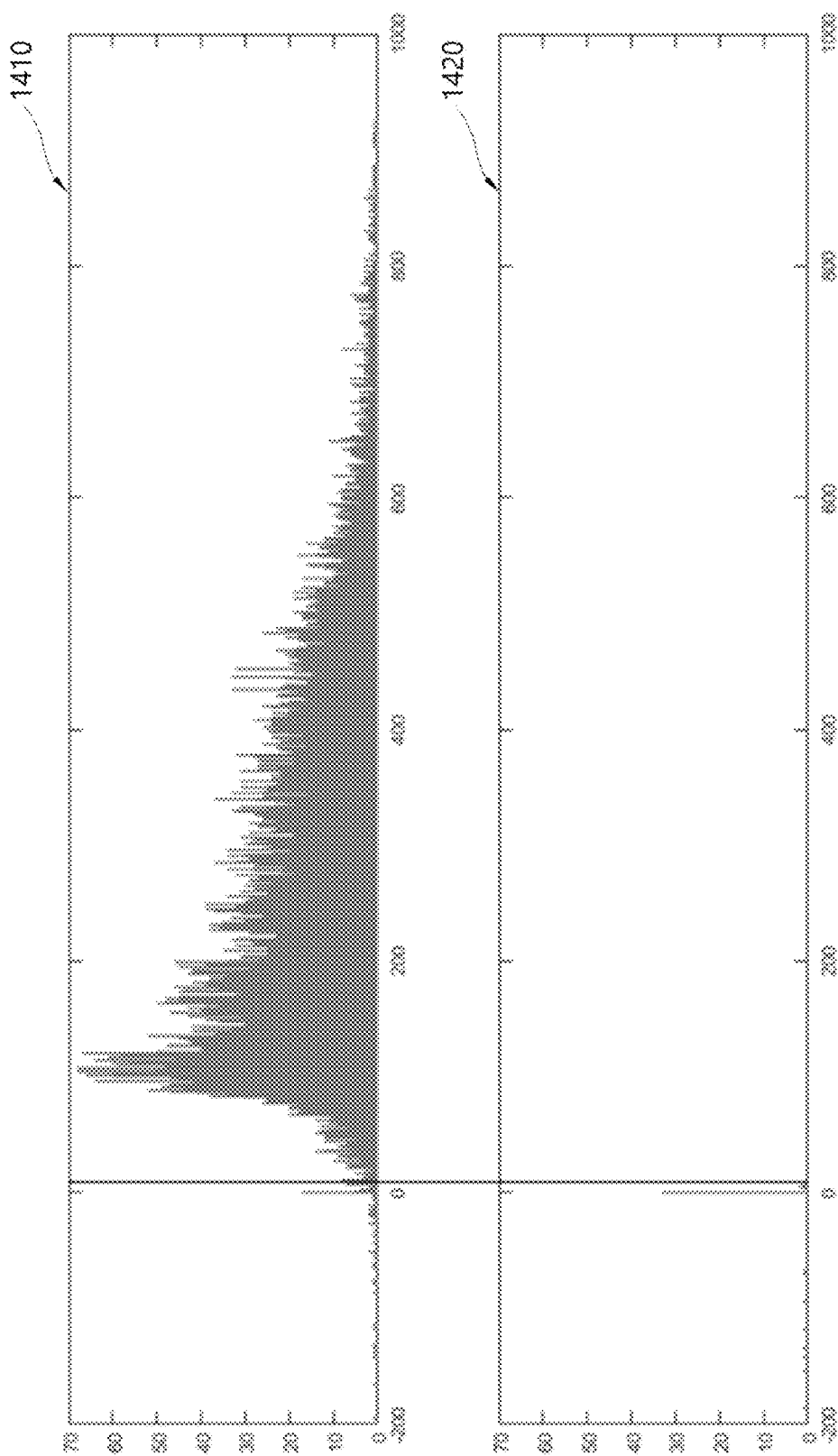
FIG. 14 is a conceptual diagram illustrating an operation of setting a matching degree from a score distribution of correctly recognized final candidate location information and a score distribution of incorrectly recognized final candidate location information shown in FIG. 3.

FIG. 14 is a conceptual diagram illustrating an operation of setting a matching degree from a score distribution of correctly recognized final candidate location information and a score distribution of incorrectly recognized final candidate location information shown in FIG. 3. Referring to FIG. 14, an unusual situation such as a sensor output error, ambient noise, and a lane change may occur in a real road situation. In such an unusual situation, the technique for recognizing a driving lane in some forms of the present disclosure may not operate normally. Accordingly, a detection result or a recognition result in an unusual situation may be processed as an exception through invalidity determination.

To this end, whether each frame is valid is output on the basis of a predetermined invalid determination condition. Three types of invalid determination conditions may be set.

Invalid Determination Condition 1:

When a matching degree score of finally selected final candidate location information is smaller than the matching degree, the final candidate location information is processed as being invalid. Each of the matching degree scores of the correctly recognized candidate location information generally has a value of zero or more (1410). In contrast, a tendency of the matching degree score of the incorrectly recognized candidate location information, which has a value that is smaller than zero may be confirmed through a distribution map (1420). The matching degree may be set through a data distribution obtained from the results of some of the pieces of data.

Invalid Determination Condition 2:

When a residual amount of a sensor (e.g., LiDAR) present in the lane in the finally selected final candidate location information is greater than the matching degree, the residual amount is processed as being invalid. The residual amount of the distance sensor 131 being large means misrecognition of the finally selected candidate. The matching degree may be set in the same manner as in the invalid determination condition 1.

Invalid Determination Condition 3:

When the driving lane recognized by the image sensor 134 is determined as being invalid through a validity test, the driving lane is processed as being invalid. This will be described below with reference to FIG. 15.

Figure 15:
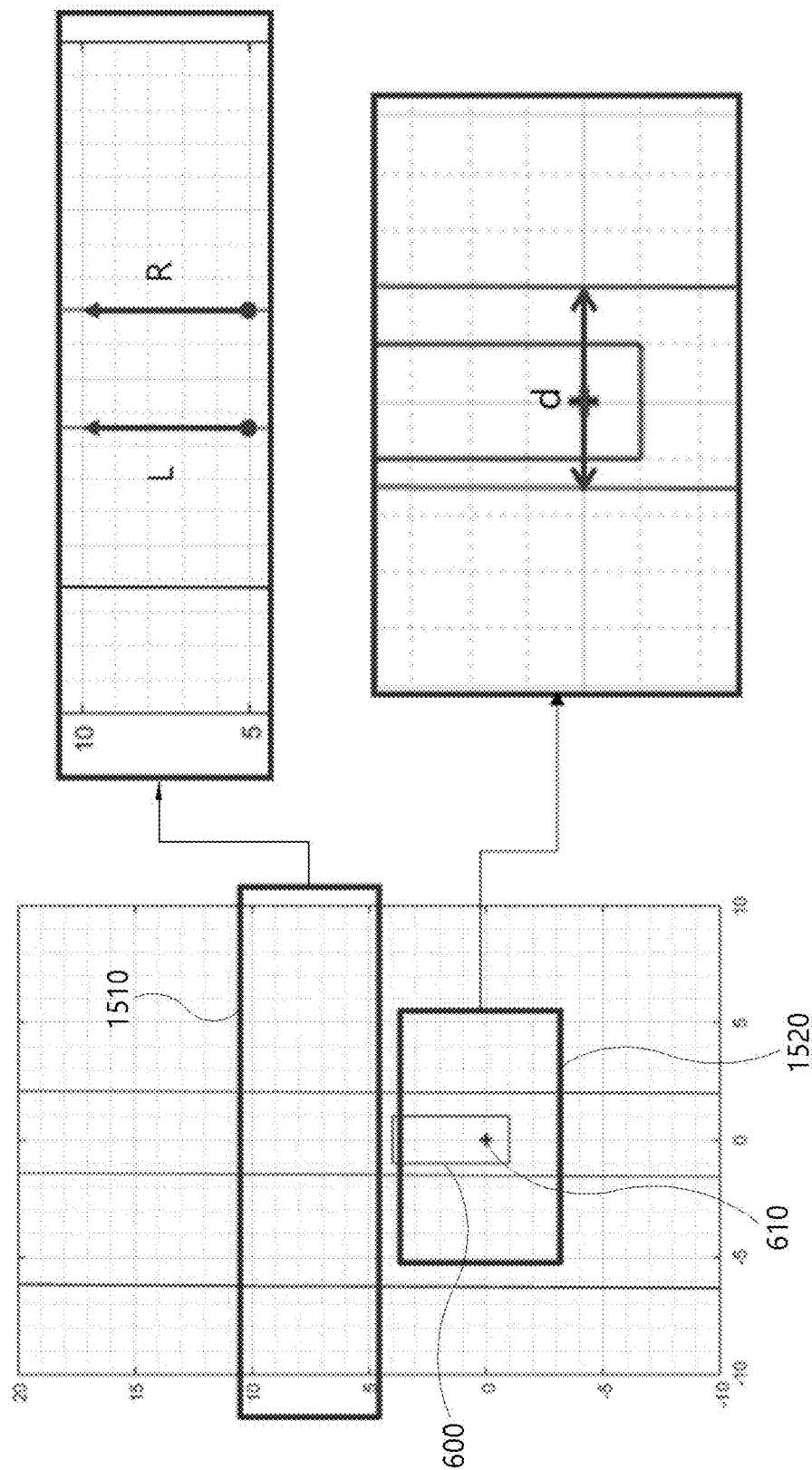
FIG. 15 is a diagram for describing a concept of an operation of determining invalidity shown in FIG. 3.

FIG. 15 is a diagram for describing a concept of an operation of determining invalidity shown in FIG. 3. In particular, FIG. 15 shows a method using the invalid determination condition 3. Referring to FIG. 15, since a candidate position of the own vehicle is set using lane information recognized by the image sensor 134, when the result recognized by the image sensor 134 is invalid, an incorrectly recognized result is inevitably obtained. Therefore, a validity test of the driving lane recognized by the image sensor 134 is the most important determination condition for invalidity determination.

Whether lanes are parallel to each other 1510 is determined by calculating directions of left and right lanes present within a range from 5 m to 10 m in front of the own vehicle and determining a difference in direction between the left and right lanes.

Whether the own vehicle deviates from a road width 1520 is determined by calculating lateral offsets of the left and right lanes based on the center of the own vehicle, calculating a difference between the lateral offsets, and comparing the difference with a general road width d.

Consequently, it is possible to limit the use of a result of road boundary incorrect detection or driving lane misrecognition due to errors of the image sensor output and the distance sensor output through the function of determining invalidity. As a result, a driving lane recognition rate is increased.

In addition, an error of the image sensor output mainly occurs during a lane change. The error of the image sensor output directly affects misrecognition of the driving lane. Thus, a misrecognition result due to the error of the image sensor output may be processed as exception through the invalid determination condition 3.

In addition, the output error of the distance sensor (especially, the LiDAR sensor) is unpredictable, and this also has a direct effect on the misrecognition of the driving lane. Thus, a misrecognition result due to the error of the distance sensor output may be processed as exception through the invalid determination conditions 1 and 2.

The test results according to the invalid determination conditions 1 to 3 are shown in the following table.

TABLE 1

| | |
|---|---|
| Ratio of invalid frame | 3.43% |
| Driving lane recognition rate | 99.58% |
| Processing time | 32.9 ms |

The processing time was obtained using a Matlab program of The MathWorks, Inc.

Meanwhile, even in the case of a lane in which a distance sensor output is hardly occurs, previous frames may be accumulated to maintain lane boundary information. That is, even when the lane boundary information is lost by surrounding vehicles, a lane boundary may be detected by accumulating previous lane boundary information.

In addition, the operations of the method or algorithm described in some forms of the present disclosure may be implemented in the form of a program command which is executable through various computer means, such as a microprocessor, a processor, a central processing unit (CPU), and the like, and may be recorded in a computer-readable medium. The computer-readable medium may include program (command) codes, data files, data structures, and the like alone or in combination.

The program (command) codes recorded in the computer-readable recording medium may be specially designed and configured for some forms of the present disclosure or may be known and available to those skilled in the computer software. Examples of the computer-readable recording medium may include magnetic media such as a hard disk, a floppy disk, a magnetic tape, and the like, optical media such as a compact disc read only memory (CD-ROM), a digital versatile disc (DVD), a blu-ray disc, and the like, and semiconductor memory devices, which are specifically configured to store and execute program (command) codes, such as a read-only memory (ROM), a random access memory (RAM), a flash memory, and the like.

Here, examples of the program (command) codes include machine language codes generated by a compiler, as well as high-level language codes which are executable by a computer using an interpreter or the like. The above-described hardware devices may be configured to operate as one or more software modules so as to perform an operation of the present disclosure, and vice versa.

In accordance with the present disclosure, there is an effect in that, even when a shape of a road boundary is complicated or there is a lot of noises outside the road boundary or in a road, the road boundary can be accurately detected through road boundary determination by matching with a precision map.

In addition, as another effect of the present disclosure, it is possible to limit the use of a result of incorrect detection of the road boundary or driving lane misrecognition due to errors of a camera sensor output and a light detection and ranging (LiDAR) sensor output through a function of determining invalidity so that a driving lane recognition rate can be increased.

While the present disclosure has been described with reference to the accompanying drawings, it will be apparent to those skilled in the art that various changes and modifications may be made without departing from the spirit and scope of the present disclosure without being limited to some forms of the present disclosure. Accordingly, it should be noted that such alternations or modifications fall within the claims of the present disclosure, and the scope of the present disclosure should be construed on the basis of the appended claims.

What is claimed is:

1. An apparatus for recognizing a driving lane of a vehicle based on multiple sensors that are located on the vehicle, the apparatus comprising:
a first sensor configured to calculate road information, wherein the road information includes at least road boundaries;
a second sensor configured to calculate moving obstacle information;
a third sensor configured to calculate movement information of the vehicle; and
a controller configured to remove the moving obstacle information from the road information to extract only road boundary data, accumulate the road boundary data to calculate pieces of candidate location information on the vehicle on the basis of the movement information, and select one among the pieces of candidate location information as final candidate location information,
wherein the pieces of candidate location information are calculated using driving lane information of the vehicle obtained using a fourth sensor or precision map lane information which is set in advance on the basis of current vehicle location information.

2. The apparatus of claim 1, wherein the controller is configured to:
extract the road boundary data from a plurality of previous frames using the movement information and accumulated in a current frame.

3. The apparatus of claim 2, wherein the controller is configured to:
when a number of previous frames is greater than a preset value, remove one farthest previous frame and add one current frame to keep an accumulated number of frames constant.

4. The apparatus of claim 3, wherein the controller is configured to:
set variably the accumulated number of frames according to a vehicle speed or a movement distance of the vehicle.

5. The apparatus of claim 1, wherein the pieces of candidate location information are calculated based on a grid formed by dividing a predetermined region of interest placed on a map road boundary of the precision map lane information at regular intervals.

6. The apparatus of claim 5, wherein the controller is configured to:
form the grid with a plurality of lateral directions and a plurality of transverse directions; and
set the plurality of lateral directions and the plurality of transverse directions as a plurality of transverse candidate location information and a plurality of lateral candidate location information.

7. The apparatus of claim 5, wherein the controller is configured to:
form the grid with a plurality of heading angles;
generate the plurality of heading angles by dividing the region of interest at regular intervals based on a center point of the vehicle; and
set the plurality of heading angles as candidate heading angle information.

8. The apparatus of claim 7, wherein the controller is configured to:
obtain the plurality of candidate location information by multiplying the plurality of lateral location information, the plurality of transverse location information, and the plurality of heading angle location information.

9. The apparatus of claim 1, wherein the pieces of candidate location information consist of only of a preset number of pieces of transverse candidate location information based on the transverse direction in consideration of a location error of the vehicle.

10. The apparatus of claim 9, wherein the controller is configured to:
determine a location of the vehicle present within one road boundary according to a ratio of a lateral offset calculated between a driving lane and a center of the vehicle.

11. The apparatus of claim 10, wherein the controller is configured to:
determine a preset number of transverse candidate location information for each lane according to the ratio of the lateral offset based on a lane position and the number of lanes which are identified in a region of interest preset in the precision map lane information.

12. The apparatus of claim 10, wherein the controller is configured to:
calculate a heading angle of each of a preset number of transverse candidate location information using a difference value between a first average of a heading angle of a left lane and a heading angle of a right lane in front of the vehicle, which are recognized through the second sensor, and a second average of a heading angle of the left lane and a heading angle of the right lane of a preset number of transverse candidate location information which are calculated through the precision map lane information.

13. The apparatus of claim 1, wherein the controller matches precision map road boundary information searched on the basis of the pieces of candidate location information with the accumulated road boundary data to assign a matching degree score to each of the pieces of candidate location information and select a lane of the final candidate location information, to which a highest matching degree score is assigned, as the driving lane.

14. The apparatus of claim 13, wherein the controller is configured to:
convert the precision map road boundary information and the accumulated road boundary data into a coordinate system including Y-axis coordinates and X-axis coordinates; and
compare values of the X-axis coordinates based on an index of the Y-axis coordinates to calculate the matching degree score.

15. The apparatus of claim 14, wherein:
the matching degree score is calculated using the number of data points located in the vicinity of the precision map road boundary information; and
the data points are generated by the first sensor, and the number of data points are the number of left points, the number of right points, and the number of points between the road boundaries on the basis of the precision map road boundary information.

16. The apparatus of claim 1, wherein the first sensor includes a distance sensor, the second sensor includes a vision sensor, the third sensor includes a motion sensor, and the fourth sensor includes a global positioning system (GPS) sensor or an image sensor.

17. The apparatus of claim 16, wherein the controller is configured to:
apply a preset invalid determination condition to the final candidate location information to determine whether the final candidate location information is valid.

18. The apparatus of claim 17, wherein the invalid determination condition includes any of a comparison condition whether the matching degree score of the final candidate location information is less than a preset first matching degree, a comparison condition whether a residual amount of the distance sensor present in the driving lane is greater than a preset second matching degree in the final candidate location information, and a determination condition whether a left lane direction and a right lane direction are parallel according to a difference between the left lane direction and the right lane direction in the final candidate location information, and whether the vehicle deviates from a road width by comparing a difference between a lateral offset of the left lane and a lateral offset of the right lane based on the center of the vehicle with a preset road width.

19. A method of recognizing a driving lane of a vehicle based on multiple sensors that are located on the vehicle, the method comprising:
a first information calculation operation of calculating, by a first sensor and a second sensor, road information and moving obstacle information, wherein the road information includes at least road boundaries;
a second information calculation operation of calculating, by a third sensor, movement information of the vehicle; and
a selection operation of removing, by a controller, the moving obstacle information from the road information to extract only road boundary data, accumulating the road boundary data to calculate pieces of candidate location information on the vehicle on the basis of the movement information, and selecting one among the pieces of candidate location information as final candidate location information, wherein the pieces of candidate location information are calculated using driving lane information of the vehicle obtained using a fourth sensor or precision map lane information which is set in advance on the basis of current vehicle location information.

\* \* \* \* \*